United States Patent [19]

Bloom et al.

[11] 4,125,685

[45] Nov. 14, 1978

[54] ELECTRICAL CELLS AND BATTERIES AND METHODS OF MAKING THE SAME

[75] Inventors: Stanley M. Bloom, Waban; Charles K. Chiklis, Lexington; Gordon F. Kinsman, Billerica, all of Mass.

[73] Assignee: Polaroid Corporation, Cambridge, Mass.

[21] Appl. No.: 811,469

[22] Filed: Jun. 30, 1977

[51] Int. Cl.$^2$ .................. H01M 4/06; H01M 4/12
[52] U.S. Cl. .................. 429/122; 429/152; 429/162; 429/217
[58] Field of Search .............. 429/162, 152, 149, 153, 429/122, 154, 217, 224, 229, 160

[56] References Cited

U.S. PATENT DOCUMENTS

| | | | |
|---|---|---|---|
| 3,563,805 | 2/1971 | Deierhoi, Jr. | 429/162 X |
| 3,734,780 | 5/1973 | Bilhorn et al. | 429/162 |
| 3,907,599 | 9/1975 | Fanciullo et al. | 429/152 |
| 4,007,472 | 2/1977 | Land | 429/162 X |
| 4,028,479 | 6/1977 | Fanciullo et al. | 429/152 |
| 4,047,289 | 9/1977 | Wolff | 429/162 X |

Primary Examiner—Anthony Skapars
Attorney, Agent, or Firm—John W. Ericson

[57] ABSTRACT

A laminar triplex structure for use in the manufacture of electrical cells and batteries, cells and batteries made therefrom, and methods of making the same. The laminate comprises a thin flat sheet of separator material, a layer of metallic particles on one surface of the separator sheet and adhered thereto with a binder, and a layer of conductive plastic adhered to the layer of metal particles. The laminate is made by the process of coating a dispersion of metal particles in a solution of a polymeric binder in an organic solvent over the separator, drying to remove the solvent, coating over the dried metal layer with a dispersion of conductive particles in a solution of a polymer in an organic solvent, and drying to remove the solvent.

27 Claims, 14 Drawing Figures

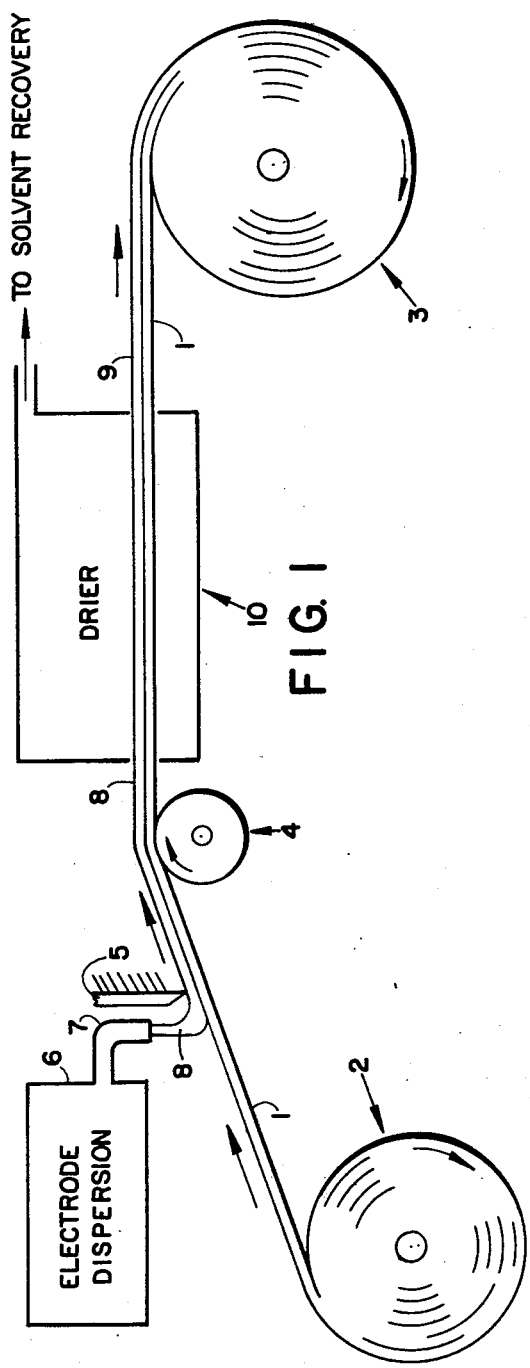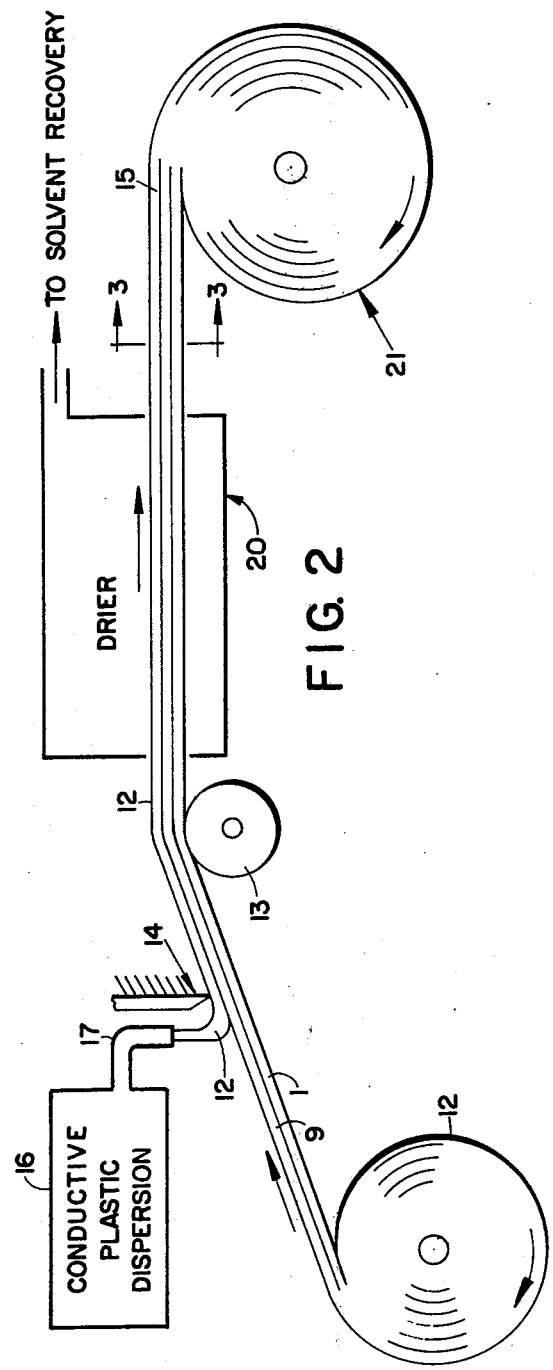

ELECTRICAL CELLS AND BATTERIES AND METHODS OF MAKING THE SAME

This invention relates to electrical cells and batteries, and particularly to novel thin flat laminar cells and batteries and to methods and articles for making the same.

It has been found possible to make thin flat laminar batteries with sufficiently low internal impedance to suit them for use in very high current drain applications. A particularly efficient form of battery of this kind is shown and described in copending U.S. application for Letters Pat. Ser. No. 761,651, filed on Jan. 24, 1977 by Edwin H. Land for Electrical Cells and Batteries and assigned to the assignee of this application. The object of this invention is to simplify the manufacture of batteries characterized by series connected cells comprising thin, flat laminar cell components.

Briefly, the above and other objects of the invention are attained by forming a triplex laminate comprising a conductive plastic intercell connector, a laminar electrode and a separator adhered together in an integral structural unit. The laminate may be made in long runs of sheet by continuous coating processes. In a particular and presently preferred embodiment of the invention, the separator is made of unplasticized cellophane, and the coated electrode material is powdered zinc. A dispersion of the zinc powder and carbon black is made in a solution of a polymeric binder in an organic solvent. This dispersion is coated on one side of the cellophane, and the solvent removed by drying in heated air. The dispersion coating may be a continuous one, but may alternatively be deposited only in predetermined electrode site regions, as by extrusion. The zinc coated side of the coated cellophane is then coated with a dispersion of carbon particles in a solution of an elastomer in an organic solvent. The solvent is then removed by drying in heated air, to form the finished laminate. In the manufacture of cells from this laminate, a wet slurry cathode containing aqueous electrolyte is applied to a central region of the cellophane side of the laminate, causing the cellophane and thence the zinc layer to be wet by the electrolyte to complete a cell. Batteries may be made by the superposition of cells of this kind, in a manner which will be apparent from the following detailed description, together with the accompanying drawings, of various illustrative embodiments of the invention.

IN THE DRAWINGS

FIG. 1 is a schematic elevational sketch illustrating the first steps in the process of making a triplex laminate in accordance with one embodiment of the invention;

FIG. 2 is a schematic elevational sketch illustrating the final steps in the process of making a triplex laminate in accordance with the invention;

Figure 3:
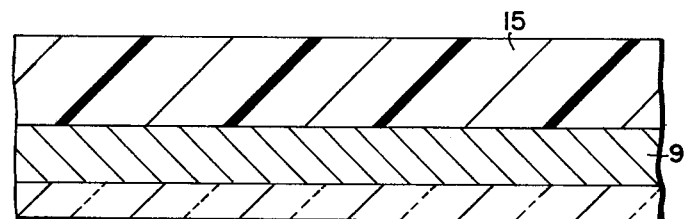
FIG. 3 is a fragmentary cross-sectional elevational sketch, on an enlarged scale, taken essentially along the lines 3—3 of FIG. 2 and showing the several layers of the laminate in FIG. 2 in relatively close proportions to those preferred.

Referring to FIG. 1, the process of making a triplex laminate according to one embodiment of the invention begins with the coating of an electrode dispersion on a web of separator material. As the separator material, any of those commonly employed in the battery art can be used, such as paper and various woven and non-woven natural and/or synthetic liquid permeable materials. However, there are particular advantages in the use of regenerated cellulose as the separator in a LeClanche system, and the process of the invention has been found to take advantage of certain quite peculiar properties of regenerated cellulose that enhance its value in such systems. Accordingly, while it should be understood that the invention in its broader aspects can be practiced with other suitable materials, it will be particularly described in connection with its preferred embodiment in which regenerated cellulose, and specifically a sheet of cellophane free of humectants and plasticizers, serves as a separator. A particularly suitable form of cellophane for this purpose is PUD-O cellophane, 1.34 mils in thickness, as made and sold by E. I. duPont de Nemours & Co. of Wilmington, Del.

As illustrated in FIG. 1, the separator may be conveniently supplied as a web 1 from a supply reel 2, whence, after coating, it is ultimately taken upon on a take-up reel 3 that is driven in any conventional manner. As will be obvious to those skilled in the art, intermediate guide, drive and tensioning rolls, idler rolls, reversing rolls and the like may be employed in the path between the supply reel 2 and the take-up reel 3, but as such are conventional in the coating art and not material to the invention, they will not be specifically described.

The web 1 passes from the supply reel 2 over a guide roller 4 so that it moves upward past a coating station comprising a conventional doctor blade 5 that is adjusted to a fixed height in dependence on the thickness of the coating desired. Electrode dispersion 8 is pumped from a suitable container 6 and deposited by a supply tube 7 on the cellophane sheet 1. The coated thickness is regulated by the doctor blade 5.

The coated web moves from the guide roller 4 through a conventional dryer schematically indicated at 10, where the coated slurry 8 is dried in heated air to remove the solvent and form a dry layer 9. In industrial practice, the solvent would preferably be recovered by conventional means, as schematically illustrated. The dried coated product, comprising a layer 9 of electrode particles adhered to the cellophane sheet 1, is taken up on the supply reel, where it may be stored for second coating in a manner to be described. Alternatively, the dried and coated web material may be passed directly to the next coating operation.

The electrode dispersion 8 generally comprises a dispersion of metal particles, for example, zinc, magnesium, silver, cadmium or aluminum particles or the like, depending on the electrochemical system to be used in the batteries to be produced. However, in accordance with the preferred embodiment of the invention, powdered zinc, or powdered zinc together with a little carbon black, are preferably dispersed in an organic solvent. A polymer is added to the solvent to act as a binder for the zinc and carbon particles when the solvent is removed.

It has been found essential to use an organic solvent to prepare the electrode slurry, because an aqueous slurry, while readily coated, will, upon drying, cause such distortion of the cellophane that the product will be useless for the purposes here described. Organic solvents that may be employed are alcohols, Ketones, esters and aromatics. Toluene is the presently preferred solvent.

Compositions that have been found especially successful for use as the electrode dispersion 8 are described in copending U.S. application Ser. No. 811,471, filed concurrently with this application by Charles K. Chiklis for Conductive Compositions and Coating Compositions For Making The Same, and assigned to the assignee of this application. The presently preferred composition for this purpose is as follows, in percent by weight based on the total weight of coating composition:

| Powdered zinc | 56.9 |
| Carbon black | 1.7 |
| Polymeric binder | 4.6 |
| Toluene | 36.8 |
| Total | 100.0 |

The polymeric binder in the above composition was a radial teleblock copolymer of 70 parts by weight of butadiene and 30 parts by weight of styrene based on the total weight of polymer and available as Solprene 411C from Phillips Petroleum Company. Other soluble or dispersable polymeric binders with adequate power to bind the zinc and carbon black to the cellophane, and later to assist to some extent in bonding the coated zinc layer to the conductive plastic layer to be added, may be employed. However, preferred materials are elastomeric in nature to reduce the brittleness and the tendency to chalk and flake characteristic of anodic compositions with a high metal content. The composition given above, when dried on a cellophane web, is 90.1 percent zinc powder, 2.6 percent carbon black, and 7.3 percent copolymer, based on the total weight of dried composition.

Drying conditions in the dryer 10 will, of course, be determined in part by the exact nature of the composition of the electrode slurry 8, and by the vapor pressure of the chosen solvent or solvent blend employed. For the electrode slurry described above as the preferred example, a two stage dryer 10 was used, with temperature of 110° F. in the first stage and 120° F. in the second stage. The coating weight is adjusted so that the final thickness of the layer 9 is from about ½ mil to 2½ mils, and preferably about 2 mils in total thickness.

The dried coating should be smooth, even, free from defects, and relatively adherent to the cellophane. In this regard, it is noted that coatings of this type have been attained on cellophane, and that the coated material can readily be handled without damage or loss of the zinc coating while the cellophane is dry. After the cellophane becomes wet during assembly of the battery in the manner to be described, however, the bond will be affected. This matter will be discussed in more detail below.

FIG. 2 illustrates the application of a conductive plastic layer to cellophane coated with a dried zinc layer 9. This material may be supplied to the coating apparatus from the roll 3, whence it is passed over a guide roll 13 past a coating station at which there is a doctor blade 14.

With the exception of details to be noted, the coating apparatus may be the same as that described above in connection with FIG. 1. In fact, the same apparatus has been used, with suitable adjustment of the doctor blade 14, and of the temperatures in the dryer to be described.

A conductive plastic slurry 12 is supplied from a suitable storage container 16 and is pumped from the container 16 by any conventional means, not shown, through a supply conduit 17, from which it is deposited as a constant reservoir on the coating 9 on the cellophane sheet 1.

The wet coating 12 from the coating station is carried through a dryer 20 where it is dried with heated air, as discussed above, to form a dry layer 15. It has been found that temperatures in the neighborhood of 200°–210° F. are appropriate for drying the dispersion layer 12. The dispersion 12 is preferably coated to a greater thickness than the zinc coating, so that somewhat higher temperatures and longer drying times are required because of the increased solvent load. From the dryer 20, the triplex laminate, which now has a dry coating 15 of conductive plastic, is taken up on a suitable take-up reel 21 in the manner similar to that described above with respect to the duplex coating of FIG. 1.

The formulation 12 is preferably a dispersion of carbon particles in an organic solution of a suitable thermoplastic material. The carbon is preferably carbon black, and most preferably Shawinigan Black as made and sold by Shawinigan Products Corp. of New York, N.Y. A rubbery binder is strongly preferred for the thermoplastic constituent of the conductive plastic slurry, as the carbon filled film formed when the solvent is evaporated tends to be tougher, more resilient and less prone to damage caused by stress through handling of the product. The presently preferred elastomer is the radial teleblock copolymer of styrene and butadiene described in the above cited copending U.S. application Ser. No. 811,471. Organic solvents are presently preferred for use in making up coating the dispersion 12. Aqueous systems can sometimes cause distortion of the cellophane during coating. A presently preferred coating composition for use as the slurry 12 is as follows, in percent by weight based on the total weight of slurry:

| | |
|---|---|
| Carbon black | 6.5 |
| Elastomer | 18.6 |
| Toluene | 74.9 |
| Total | 100.0 |

The elastomer used was Solprene 411C, described above. This composition dried to a composition of 25.9 percent carbon black and 74.1 percent elastomer, based on the total weight of dried conductive plastic 15.

The conductive plastic layer 15 has been made and used successfully in thickness from ½ mil to about 5 to 7 mils. Very successful batteries have been made with the ½ mil coatings 15, but the presently preferred range is about 3 to 4 mils in thickness. The higher coating thickness is desirable, because it is found that the conductive plastic formed is sufficiently conductive that the thickness is not critical, while the added insurance against defects makes it easier to manufacture a product of uniformly high quality. If desired, the conductive plastic coating may be applied in two or more sequential layers, with intermediate drying, as another means of minimizing the occurrence of defects. FIG. 3 shows the elements of the finished web in relative thicknesses close to those preferably employed.

Figure 4:
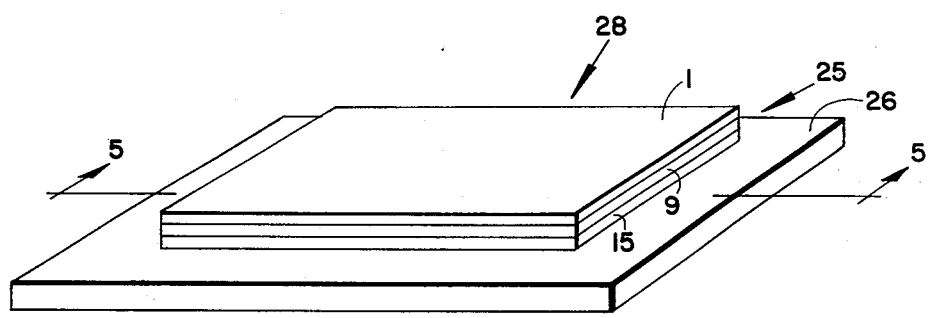
FIG. 4 is a schematic perspective three quarter view of a framed triplex subassembly suitable for use in the manufacture of electrical cells and batteries in accordance with one embodiment of the invention.
Figure 5:
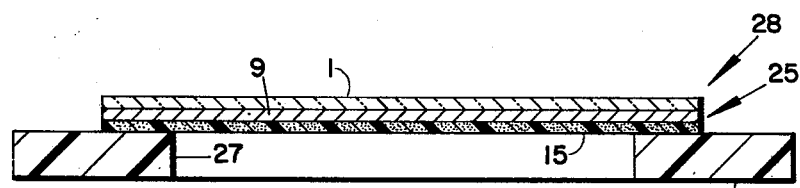
FIG. 5 is a schematic cross-sectional elevational sketch, on an enlarged scale, of the subassembly of FIG. 4, taken essentially along lines 5—5 in FIG. 4.

Following manufacture of the triplex laminate just described, it is cut into convenient pieces for the manufacture of batteries. FIGS. 4 and 5 show such a piece 25 of the laminate in the form of a rectangular sheet adhered to a frame 26 to form a subassembly useful in the manufacture of cells and batteries by a process to be described below. The frame 26 may be of any suitable thermoplastic material which can be sealed to itself and to the conductive plastic layer 15.

One suitable material for the frame 26, and other frames to be described, is Versalon 1140 polyamide resin, as made and sold by General Mills Company of Minneapolis, Minn. A currently preferred material, however, is a radial teleblock copolymer of styrene and butadiene containing 30 percent styrene and 70 percent butadiene by weight of copolymer, essentially the same as the copolymer preferably used in the conductive plastic composition described above, but preferably of a lower molecular weight. A suitable composition for this purpose is Solprene 416S, as made and sold by Philips Petroleum Company. This material may be compounded with from 0 to 30 percent by weight, based on the total weight of plastics, of high flow polystyrene. In practice, the thermoplastic constituents are blended in a Banbury mixer, with conventional antioxidants and a small amount of stearic acid, then milled, extruded, cooled, and chopped into beads. The beads are then remelted and extruded into sheets, from 5 mils to 25 mils in thickness. About 15 mils is presently preferred. The more polystyrene that is included, the stiffer the material becomes. About 75 percent of the radial teleblock copolymer and 25 percent of polystyrene by weight based on the weight of polymers is a desirable ratio in the range of 15-20 mils in thickness.

The frame 26 is formed with an internal rectangular opening 27 that is well within the confines of the laminate 25 and forms a central opening to receive other cell components to be described. The laminate 25 and the frame 26 are preferably heat sealed together to form a unitary subassembly 28 for manufacture, as will next be described in connection with FIG. 6.

Figure 6:
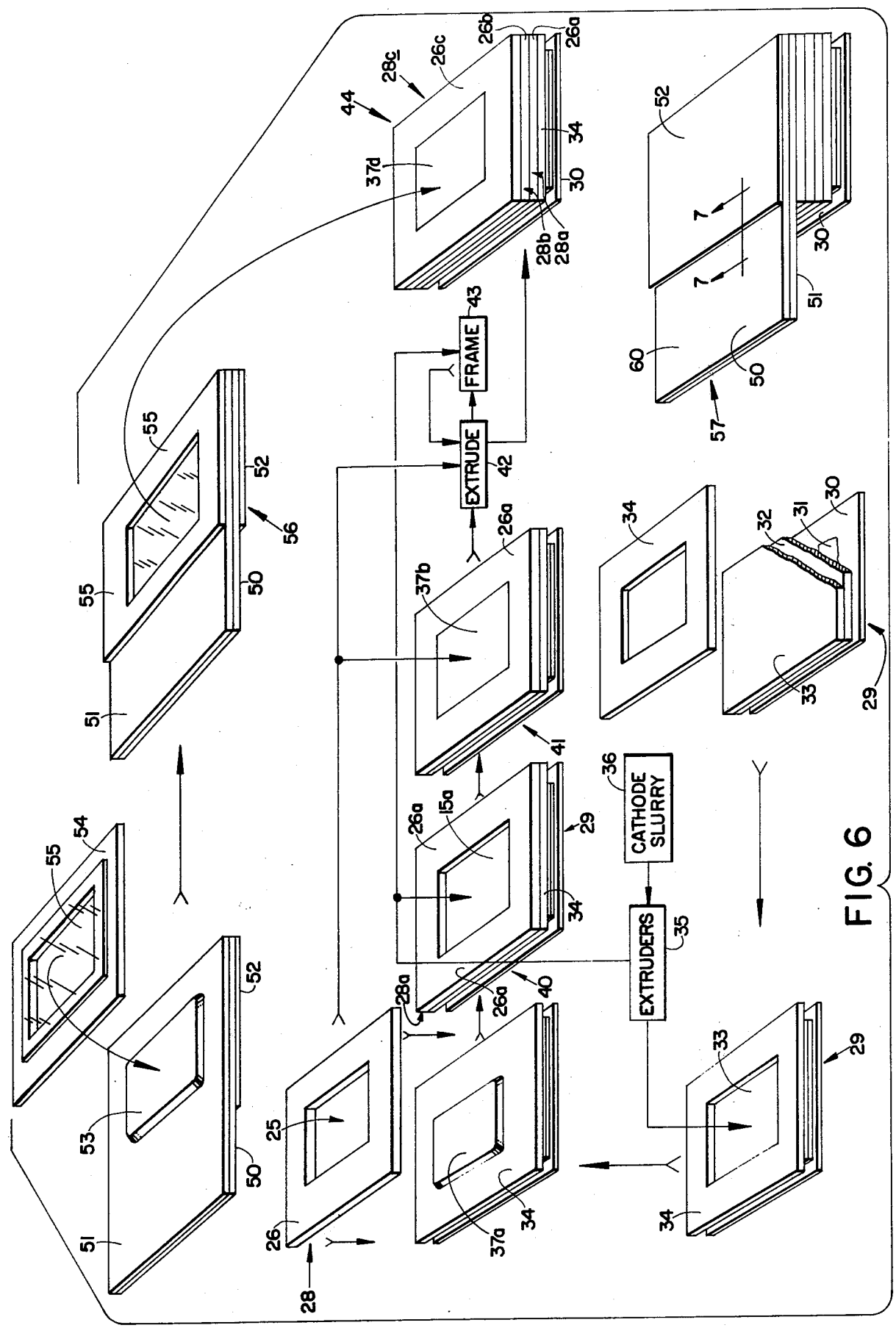
FIG. 6 is a schematic perspective exploded sketch, block and flow diagram illustrating a process of manufacturing batteries using subassemblies of the kind shown in FIGS. 4 and 5.

Referring to FIG. 6, manufacture of a battery in accordance with the invention may begin with the preparation of a cathode terminal subassembly 29 comprising three laminae adhered together and consisting of a base sheet 30, of 5 mil kraft paper or the like, which may serve as a part of a carrier web to be used in manufacturing batteries in a manner known in the art per se, but which in any case extends outwardly slightly beyond the other components for purposes of insulation, convenience in transport and registration of components, ease in cutting following assembly, and the like.

The sheet 30 may be formed with an aperture 31 which will later serve to admit contacts of electrical apparatus to engage a cathode metal end terminal sheet 32, which may consist of aluminum, tinned steel, or the like, and is preferably about 2 mils in thickness. Adhered to this metal terminal sheet 32 is a cathode current collector sheet 33 of conductive plastic, such as Condulon conductive vinyl sheet as made and sold by Pervel Industries, Inc, and, for example, of about 2 mils in thickness. Alternatively, the current collector 33 may be made by the process of casting the coating composition 12 of FIG. 2 onto suitably primed steel or aluminum sheets. A suitable primer for steel is described in copending U.S. application for Letters Pat. Ser. No. 742,837, filed on Nov. 18, 1976 by Neal F. Kelly for Conductive Laminate And Methods And Compositions For Making The Same, and assigned to the assignee of this application. A suitable primer for aluminum is described in U.S. application for Letters Pat. Ser. No. 801,519, filed on May 31, 1977 by Herbert N. Schlein for Methods And Compositions For Adhering Metal to Plastic and assigned to the assignee of this application. Said applications Ser. Nos. 742,837 and 801,519 are incorporated herein by reference, and are referred to for the details of the priming compositions and methods of application.

As suggested in FIG. 6, to the cathode subassembly just described is added a frame 34 of insulating material. One suitable material is the Versalon 1140 polyamide hot metl adhesive resin described above. The frame 34 may be heat sealed to the conductive plastic surface of the collector 33, to form a liquid tight seal. The Versalon 1140 resin mentioned above can be sealed in this manner by the application of heat, with or without pressure.

The thickness of the frame 34 is not particularly critical, but if desired it can be relatively thin, as the frame 34 serves only an insulating purpose to be described; it incidentially serves as part of the battery seal in the final assembly, as will appear, but this function itself could be performed by other framing elements to be described.

When the frame 34 is assembled onto the end cell assembly 29 and there sealed as just described, the combination is passed to a conventional extruder 35 which receives a supply of cathode slurry from a suitable supply vessel 36 and applies a layer of cathode slurry over the surface of the current collector 33 within the opening provided in the frame 34. It should be noted that the frame 34 protrudes slightly beyond the edges of the end terminal comprising the current collector 33 and the metal terminal sheet 32 to perform a desired insulating function.

As suggested in the drawing, when a thin frame 34 is used, the first cathode layer 37a may protrude above the surface of the frame.

The next operation in the assembly of a battery in accordance with this embodiment of the invention is the addition of one of the subassemblies 28, described above in connection with FIGS. 4 and 5, to the frame 34, in such a manner that the cellophane separator portion will contact the cathode slurry layer 37a. As shown in FIG. 6, the assembly 28 is placed onto the frame 34 for this purpose with the conductive plastic side 15 up. The result is the subassembly illustrated at 40 in FIG. 6.

Next, a layer of cathode slurry is extruded onto the surface of the conductive plastic 15a of the first subassembly 28a within the opening in the frame 26a to form a subassembly 41 having a cathode layer 37b as indicated in FIG. 6. Onto this assembly 41 is next placed a second subassembly 28b, by an operation repetitive of that just described and not shown in FIG. 6, followed by the extrusion of another cathode layer onto the opening of the frame, as suggested by the block 42 in FIG. 6, whereupon the next subassembly 28c is added as shown by the block 43 in FIG. 6. The final cathode slurry layer 37d is added by repeating the process shown by the block 42, and the result is a subassembly indicated at 44 in FIG. 6 that is ready for an anode terminal assembly.

The anode terminal assembly 56 is prepared from a subassembly indicated in FIG. 6 as a metal end terminal sheet 50 of tinned steel, aluminum, or the like, preferably about 2 mils in thickness, to which there is adhered a conductive plastic anode terminal collector 51 which may be of the same material and thicknes as the cathode current collector sheet 33. A thin layer 52, which may be a glassine overwrap layer substantially coextensive with the area of the finished battery and employed for aid in sealing in the manner described in U.S. Pat. No. 4,019,251, granted Apr. 26, 1977 to Thomas P. McCole for Flat Battery and Method of Manufacture, and assigned to the assignee of this application, may be adhered to the steel 50 at this stage, or if desired, may be added at a later stage.

On the anode current collector sheet 51 is deposited a zinc anode patch 53. In accordance with one practice of the invention, this anode patch 53 was made as a thin layer of zinc powder with a binder extruded onto the surface of the conductive plastic anode current collector 51 in a conventional manner, and dried. In accordance with this particular embodiment, the current collector 51 was made of 2 mil Condulon conductive vinyl resin as described above, and the zinc anode patch 53 was made from the following composition, expressed in parts by weight:

| Zinc powder | 1,000 |
| H$_2$O | 149.2 |
| Benton LT | .61 |
| Tetrasodium pyrophosphate | .25 |
| Shawinigan Black | 5 |
| Polytex 6510 latex | 39.05 |

Polytex 6510 is an acrylic emulsion resin made and sold by Celanese Corporation of Newark, New Jersey. Benton Lt is an organic derivative of hydrous magnesium silicate as made and sold by National Lead Company, Inc., of New York, N.Y.

Over the dried patch 53 is next placed a framed separator subassembly comprising a frame 54, which may be of insulating material and, for example, of the same thermoplastic composition as for the frames 26 and 34 described above. To this frame 54 is temporarily heat sealed a cellophane separator 55. As suggested in FIG. 6, the frame is inverted and placed down over the anode collector 51 with the cellophane separator 55 in contact with the zinc patch 53. The frame 54 is then heat sealed to the surface of the conductive plastic 51 to form the anode terminal subassembly 56 as shown in FIG. 6. In practice, best results have been obtained by coating the zinc patch 53 with a layer of about 5.4 mils of gel electrolyte, of a composition to be described below, before the frame 54 and cellophane separator 55 are put in place. Operable batteries can be made without this layer of gel electrolyte, but better results have been obtained with it.

The subassembly 56 just described, with or without the gel electrolyte, is inverted and placed down over the subassembly 44 to produce an unsealed battery suggested at 57 in FIG. 6. As indicated, the end 60 of the collector sheet 50 and metal terminal 51 projects outwardly from the body of the battery. The purpose of this extension is to allow the terminal to be folded around over the insulating kraft paper layer 30 to the other side of the battery, making the anode terminal accessible on the same side as the cathode terminal. Since this is a conventional matter which does not form a part of the present invention, it will not be elaborated upon.

Figure 7:
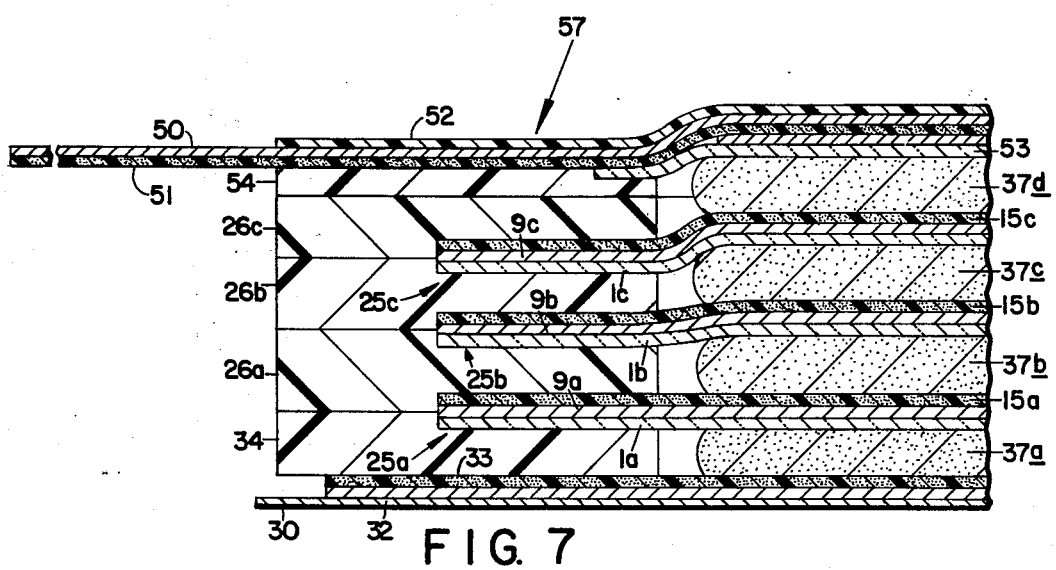
FIG. 7 is a fragmentary cross-sectional view, on an enlarged scale, of an illustrative portion of a battery made in accordance with the process of FIG. 6, taken essentially along the lines 7—7 in FIG. 6 but showing the battery after sealing.

FIG. 7 shows the details of the battery 57 of FIG. 6 following sealing. Sealing is carried out by applying heat and pressure around the edges of the battery in a known manner, and so effects some compaction as suggested in FIG. 7. Sealing is carried out under conditions such that the edges of the triplex laminates 25a, 25b and 25c are well buried in a thermoplastic frame, so that when the cellophane separators 1a, 1b and 1c become wet, the resulting loss of bond between the cellophane and the frame and the zinc layers will not cause leakage. The composition of the cathode slurry used to make the layers 37a, 37b and 37c and 37d is selected to provide sufficient moisture to wet both the cellophane separators and the zinc anode layers 9a, 9b, 9c and 53. For this purpose, compositions such as that disclosed in the above-cited U.S. application Ser. No. 761,651 have been successfully employed, except that it is preferred to use additional water in the mix, and to add a corrosion inhibitor such as mercuric chloride. A presently preferred composition is as follows, in percent by weight based on the total weight of slurry:

| H$_2$O | 28.83 |
| NH$_4$Cl | 9.89 |
| ZnCl$_2$ | 4.99 |
| HgCl$_2$ | 1.88 |
| Shawinigan Black | 6.10 |
| MnO$_2$ | 48.81 |
| Total | 100.00 |

While the adhesive bonds between the cellophane and adjacent layers may be affected by the wetting process, the presence of the initial bond between the cellophane and the zinc layer 9 has been found to be very helpful in the process of activating the battery by liquid electrolyte diffusing from the cathode slurry through the separator into the initially dry zinc anode layers. Unplasticized cellophane swells when in contact with aqueous electrolyte solutions, and is prone to wrinkle, especially if initially constrained. However, it has been found that when the constraint takes the form of an even binding over the whole surface of the separator, as achieved with the zinc layers 9, then during wetting the cellophane apparently tends to swell uniformly, and thus remain smooth without wrinkling while the battery comes to equilibrium.

The function of the frame 34 in the structure of FIG. 7 is to insulate the first triplex laminate 25a from the conductive plastic cathode current collector 33. It might be supposed that as good results could be attained by placing the frame 26a and the laminate 25a directly in contact with the current collector 33 and there sealing it. However, when this has been done it has been found that a short circuit may develop between the zinc layer 9a and the current collector 33. This occurs when the cellophane separator 1a is wet, and a little of the zinc comes down around the edges of the very thin separator. This problem is solved by the inclusion of the frame 34, even though the frame may be relatively thin, i.e., 5 mils or less.

Figure 8:
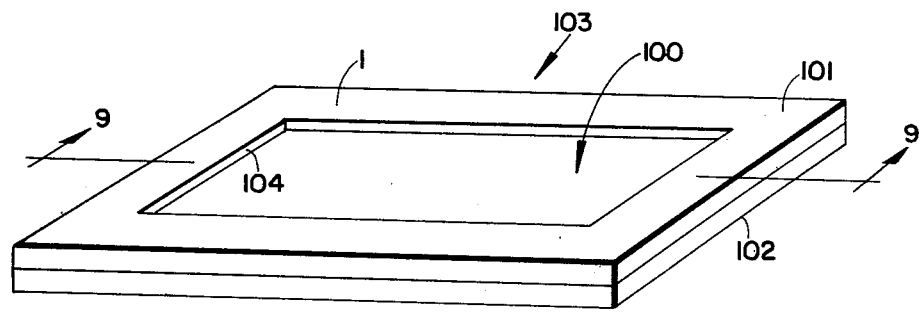
FIG. 8 is a schematic perspective three quarters view of a framed triplex subassembly suitable for use in the manufacture of electrical cells and batteries in accordance with another embodiment of the invention.
Figure 9:
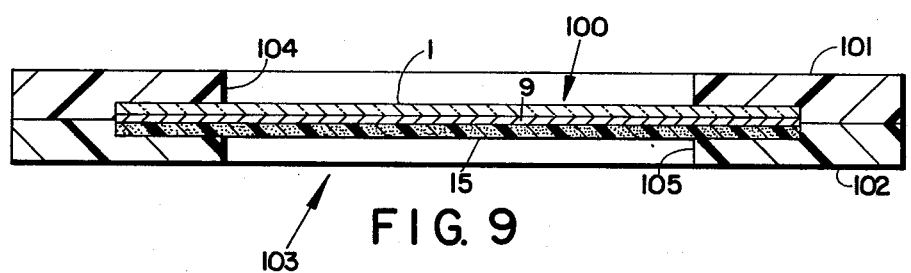
FIG. 9 is a schematic cross-sectional elevational sketch, on an enlarged scale, of the subassembly of FIG. 8, taken essentially along the lines 9—9 in FIG. 8.

FIGS. 8 and 9 illustrate a framed triplex subassembly in accordance with a modification of the invention. As in FIGS. 4 and 5 described above, the subassembly comprises a rectangular sheet of triplex laminate generally designated 100, made as described above and confined and sealed between two frame elements 101 and 102 that are sealed together to form a unitary subassembly 103. As indicated, an electrode area defining recess 104 is formed in the frame 101, and a corresponding recess 105 is formed in the frame 102. The frames 101 and 102, preferably of a hot melt adhesive with sufficient flow properties such as the Versalon 1140 polyamide resin or the particular copolymer of styrene and butadiene described above, are heated under pressure sufficiently to cause the frame elements 101 and 102 to fuse together and to periphery of the conductive plastic layer 15 to encapsulate the subassembly 100, and thereby forestall leakage after the frame subassembly 103 has been installed in the battery.

Figure 10:
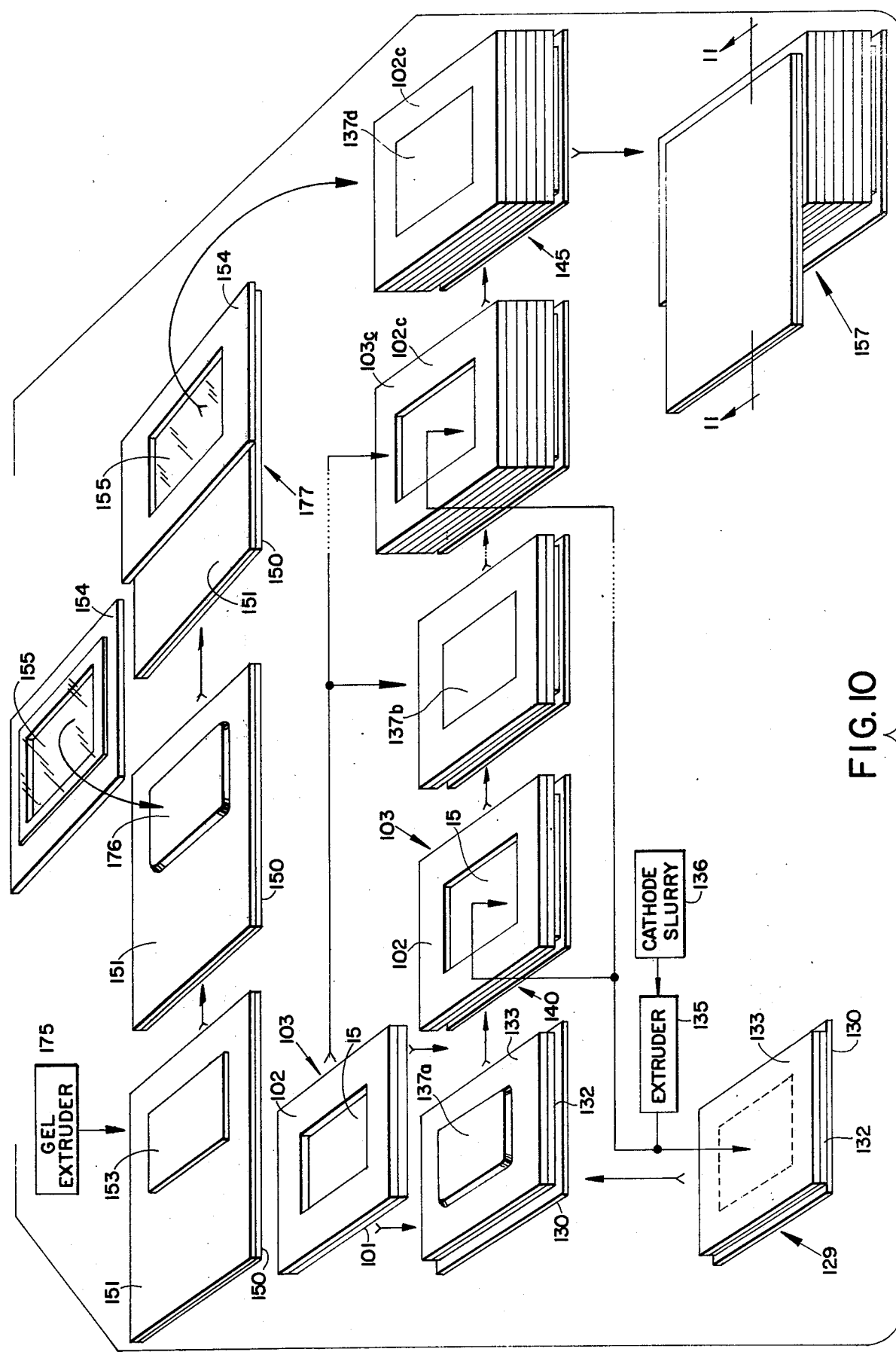
FIG. 10 is a schematic perspective exploded sketch, block and flow diagram illustrating a process of manufacturing batteries using subassemblies of the kind shown in FIGS. 8 and 9.

FIG. 10 illustrates modifications in the process of FIG. 6 occasioned by the use of subassemblies such as 103 of FIGS. 8 and 9, and also illustrates alternatives in other details of the process.

Referring to FIG. 10, a cathode terminal subassembly 129, which correspond in detail to the subassembly 29 of FIG. 6, is used as the starting point. A supply of cathode slurry in a container 136 is pumped by conventional means, not shown, to a conventional extruder 135, which deposits a first layer of cathode slurry 137a in the region of the cathode current collector 133 suggested by the dotted lines.

A subassembly 103, conductive plastic side up, is next put in position over the current collector 133 with the cellophane separator in contact with the cathode slurry 137a to produce a subassembly indicated at 140 in FIG. 10. Next, the extruder 135 adds over this subassembly 140 the next cathode slurry layer 137b. The process continues with the addition of a subassembly 103b and another layer 137c of cathode slurry in a manner not shown in detail, essentially as in FIG. 6 above, and continues until the final subassembly 103d has been completed with the addition of its cathode slurry 137d. There is thus produced a subassembly 145 which is ready for the addition of an end anode half cell subassembly.

As suggested in FIG. 10, the anode half cell assembly comprises an anode metal terminal sheet 150 prelaminated to a conductive plastic current collector 151 with an anode patch 153 that may be the same as the corresponding components 50, 51 and 53 in FIG. 6. The glassine layer has been omitted from FIG. 10 for clarity. As indicated, a gel extruder 175 applies a layer of gel electrolyte 176 over the anode patch 153 in accordance with this embodiment. The composition of the gel electrolyte may be as follows, in parts by weight:

| | |
|---|---|
| $NH_4Cl$ | 21.8 |
| $ZnCl_2$ | 9.9 |
| $HgCl_2$ | 1.9 |
| $H_2O$ | 63.5 |
| Natrosol 250 HHR | 2.9 |

Natrosol 250 HHR is hydroxyethyl cellulose as sold by Hercules, Inc. of Wilmington, Delaware.

This composition is coated over the zinc anode patch to a thickness of about 5.4 mils.

A subassembly 177 is next completed in the manner generally described above but better illustrated in FIG. 10. This subassembly 177 is inverted and placed over the subassembly 145 to produce the substantially complete battery 157 shown in FIG. 10. This battery may be completed by the addition of the glassine overwrap described above in connection with FIG. 6 and sealed under heat and pressure to produce a structure shown in illustrative detail in FIG. 11.

Figure 11:
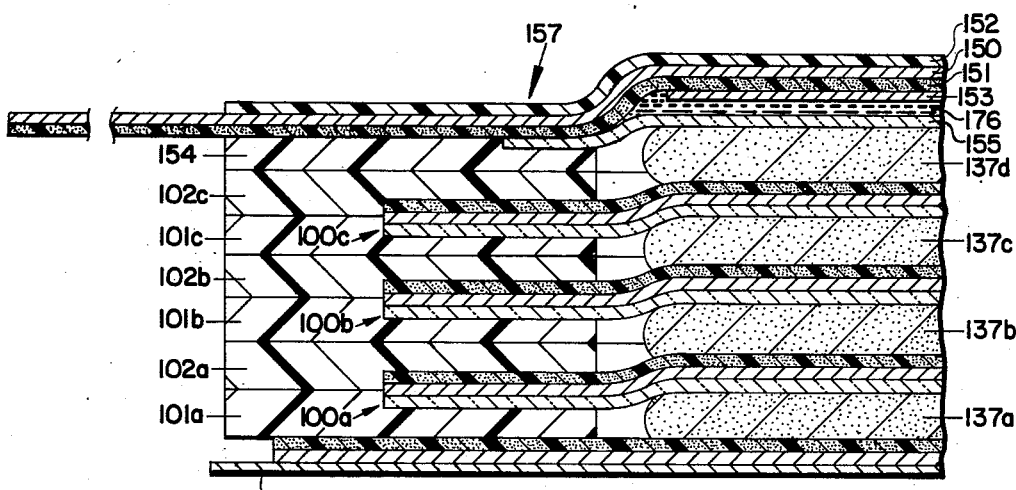
FIG. 11 is a fragmentary cross-sectional view, on an enlarged scale, of an illustrative portion of a battery made in accordance with the process of FIG. 10, taken essentially along the lines 11—11 in FIG. 10 but showing the battery after sealing.

As indicated in FIG. 11, the lowermost frame element 101a performs the same insulative function relative to the first triplex subassembly 100a as did the initial frame 34 in the structure described in connection with FIG. 6. The layer of gel electrolyte 176 has been found to minimize the effects of wrinkling of the separator 155 during assembly and later stabilization of the battery, as the gel 176 fills the hills and valleys that occur when the cellophane 155 wrinkles. Without the layer 176, this curling can impart a significant inpedance term to the overall internal impedance of the battery.

The practice of the invention will next be illustrated with reference to the following detailed examples.

EXAMPLE I

Seven four-cell batteries were made from a triplex laminate formed by coating 1.34 mil PUD-O cellophane with the specific anode coating composition given above to a dry thickness of 1 mil, followed as described above by a first coating with the specific conductive plastic composition given above to a dry thickness of 1.8 mils. A second coating with the same conductive plastic coating composition was made to a dry thickness of 1.7 mils, forming a conductive plastic layer 3.5 mils in thickness. This triplex laminate was cut into pieces 2.63 inches by 3.23 inches. The conductive plastic sides of the cut pieces of laminate were each heat-sealed to the inner borders of a frame made of 22 to 24 mil Versalon 1140 hot melt adhesive each 2.88 inches by 3.52 inches and formed with a central rectangular opening 2.10 inches by 2.77 inches. Each cathode comprised 2.5 grams of the specific slurry composition described above. The end cell used a cellophane separator (55) 3.2 inches by 2.1 inches of 1.34 mil PUD-O cellophane, a 2 mil tinned steel end terminal (50) 3.9 inches by 3.4 inches laminated to a 2 mil sheet of Condulon conductive plastic (51) of the same size, on which there was a zinc dry patch 1 mil in thickness of the specific dry patch composition given above coated with a 5.4 mil layer of the gel electrolyte composition given above.

These batteries, identified as Examples IA-IG below, were measured on the day of assembly for open circuit voltage OCV and closed circuit voltage CCV with a current interval of 0.1 second through a 3.3 ohm load. Under these particular test conditions, the internal impedance Ri, in ohms, can be calculated from the relation $Ri = 3.3 (OCV/CCV - 1)$, and is given in Table I below together with the measured values of OCV and CCV.

TABLE I

| EXAMPLE | OCV | CCV | Ri |
|---|---|---|---|
| IA | 6.80 | 6.27 | .28 |
| IB | 6.83 | 6.15 | .37 |
| IC | 6.82 | 6.34 | .25 |
| ID | 6.84 | 6.16 | .36 |
| IE | 6.84 | 6.08 | .41 |
| IF | 6.84 | 6.13 | .38 |
| IG | 6.85 | 6.50 | .18 |
|  |  | Ri ave. | .32 |

The average value for Ri for the seven batteries of Example I above is 0.08 ohms per cell.

EXAMPLE II

A four cell battery was made exactly as described above, except using 3.5 grams of slurry for each cathode, and with a triplex laminate as described above except that the conductive plastic layer was coated to a dry thickness of ½ mil. The OCV was 6.86 volts, the CCV was 6.53 volts, and the corresponding value of Ri is 0.17 ohms, or 0.04 ohms per cell. As a control, a four cell battery was made in the manner described in detail in the above cited Application Ser. No. 761,651, using 3.5 gram cathodes of the preferred composition described therein. This battery had an OCV of 6.70 volts, a CCV of 6.30 volts, and a corresponding value of $Ri = 0.21$ ohms, or 0.05 ohms per cell. These batteries, identified as Example II and Control below, were tested in the following manner:

A Polaroid SX-70 Land camera was fitted with an electronic flash unit having a light output of about thrity seven watt seconds, and an input energy requirement of about 80 watt seconds. The flash unit was connected so as to be charged from the battery under test. The battery was also used to energize the camera to perform the functions of exposure control and film advance in the normal manner, except that, experience having shown that advancing film units through the processing rolls made no detectable difference in the test, no film units were employed. In the test, the initially discharged flash unit was charged until its ready light glowed. The shutter button of the camera was then operated, causing the camera to go through its cycle, during which time the flash unit was discharged. The battery was then electrically disconnected, and allowed 30 seconds to recover. This cycle is estimated to require a total energy of about 90 to 100 watt seconds, and was carried out 15 times for each battery. Each time the flash unit was charged during the test, the time between the start of charge and the time when the ready light glowed and charging was stopped was noted.

The results of the above test are given below in terms of photographic cycle N, observed recharge time Δt, and cumulative recharge time S.

TABLE II

| BATTERY | EXAMPLE II | | CONTROL | |
|---|---|---|---|---|
| N | Δt | S | Δt | S |
| 1 | 3.6 | 3.6 | 3.2 | 3.2 |
| 2 | 3.0 | 6.6 | 3.0 | 6.2 |
| 3 | 3.2 | 9.8 | 3.2 | 9.4 |
| 4 | 3.4 | 13.2 | 3.2 | 12.6 |
| 5 | 3.4 | 16.6 | 3.4 | 16.0 |
| 6 | 3.6 | 20.2 | 3.4 | 19.4 |
| 7 | 3.4 | 23.6 | 3.4 | 22.8 |
| 8 | 3.6 | 27.2 | 3.6 | 26.4 |
| 9 | 3.8 | 31.0 | 3.6 | 30.0 |
| 10 | 3.6 | 34.6 | 3.6 | 33.6 |
| 11 | 3.8 | 38.4 | 3.6 | 37.2 |
| 12 | 3.8 | 42.2 | 3.6 | 40.8 |
| 13 | 4.0 | 46.2 | 3.8 | 44.6 |
| 14 | 4.0 | 50.2 | 3.8 | 48.4 |
| 15 | 4.0 | 54.2 | 3.8 | 52.2 |

The above results are impressive from any point of view. For example, considered for use with the SX-70 Land camera and flash unit described above, for the ten shot sequence required with a Polaroid SX-70 film, the battery of Example II offers recharge times of under 4 seconds for each of ten shots. The average recharge time for 15 shots is only 3.6 seconds. The performance of the control battery is comparable and possibly a little better, although the results are too close together to form the bsis for a conclusion from a single test, and the manufacture and assembly of the control battery are more complex.

Figure 12:
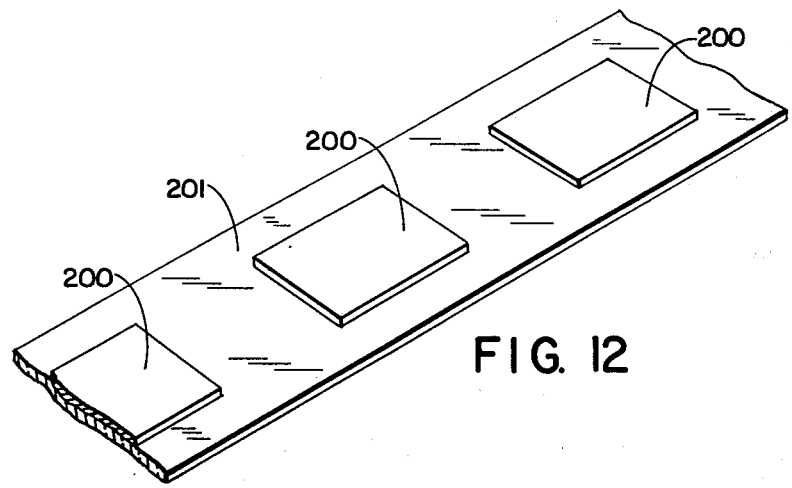
FIG. 12 is a fragmentary schematic perspective sketch of a portion of a patch coated cellophane sheet adapted to be used in the manufacture of a triplex laminate in accordance with another embodiment of the invention.
Figure 13:
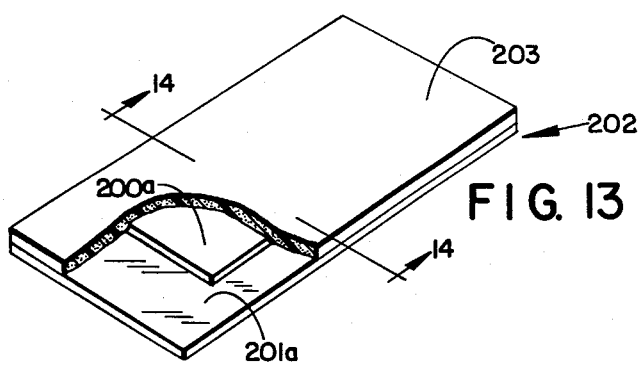
FIG. 13 is a schematic perspective sketch, with parts broken away, of a triplex subassembly in accordance with the embodiment of FIG. 12.
Figure 14:
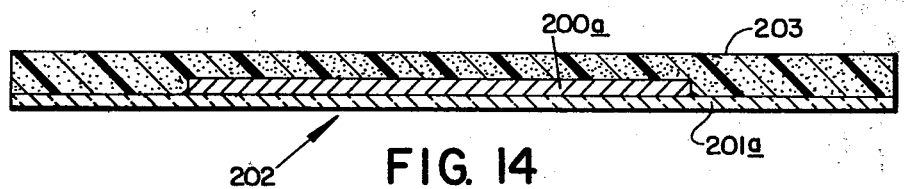
FIG. 14 is a schematic cross-sectional view of the subassembly of FIG. 13, on an enlarged scale, taken essentially along the lines 14—14 in FIG. 13.

FIGS. 12, 13 and 14 illustrate an especially useful modification of the invention in which the cellophane separator is coated with discrete anode patches. As indicated in FIG. 12, discrete anodes 200 are formed in spaced regions on a sheet of cellophane 201, as by extrusion. The zinc anode coating composition given above has been found to be extrudable in the thin layers desired; i.e., about ½ gram of dried anode material for an anode 1.875 inches by 2.5 inches, or 165.3 grams per square meter of electrode surface. After extrusion and drying to remove the organic solvent, the sheet 201 and anode patches 200 are overcoated with the conductive plastic composition described above, in the manner described in connection with FIG. 2. The triplex sheet so formed can then be cut into individual subassemblies, as shown at 202 in FIGS. 13 and 14. Each of the subassemblies 202 comprises a cellophane separator 201a adhered in a central region to a zinc anode 200a, and at the edges to the conductive plastic 203. In the coating process, the intercell connector 203 will be formed thinner in the region overlying the anode patch; for example, if the anode patch is 2 mils in thickness, the coating 203 may be made 4 mils in thickness in the regions around the anode patch, and 2 mils in thickness over the anode patch. In other words, the thickness of the laminate is uniform over the patch and between the patches, with the thickness of the coating 203 varying as dictated by the doctor blade to make up for the difference, as shown in FIG. 14.

The triplex components 202 may be used to form framed subassemblies such as described above in connection with FIGS. 4, 5, 8 and 9, and made into cells and batteries by the processes described above.

One advantage of the patch anode construction just described is that intercell insulation is improved. For example, the frame such as 34 in FIG. 7 may be omitted if desired. A second and more significant advantage has been found which is related to the manner in which the zinc anode is amalgamated after the battery is assembled. With the full coated triplex constructions first described, it has been observed that mercuric ions from the cathode diffuse through the cellophane so directly into the confronting anode region that the anode surface is amalgmated only in the region in registry with the cathode. This effect is thought to contribute to reduce shelf life. With the anode located in a patch confined to a region in registry with the anode, such differential amalgamation will not occur.

Triplex laminates in accordance with the invention may be employed in other acidic or alkaline electrochemical systems than the Leclanche system. In some instances, it may be desired to form the electrode layer in the laminate of cathodic particles, rather than of anodic particles. As a specific example of an alkaline system in which a triplex laminate could be employed, an alkaline zinc-manganese dioxide battery could be made by the procedures detailed above, except that the zinc chloride and ammonium chloride in the electrolyte used would be replaced by potassium hydroxide. Both the radical teleblock copolymer of butadiene and styrene and the Versalon 1140 resin described above are stable to caustic solutions.

While the invention has been described with respect to the details of various illustrative embodiments, many changes and variations will occur to those skilled in the art upon reading this description. Such can obviously be made without departing from the scope of the invention.

Having thus described the invention, what is claimed is:

1. An electrode subassembly, comprising a thin, flat sheet of liquid impervious conductive plastic, a thin, flat, dry layer of active anode particles adhesively bonded to said sheet, and a thin, flat, dry separator sheet of liquid permeable material adhesively bonded to said anode layer.

2. The subassembly of claim 1, in which said conductive plastic comprises a dispersion of carbon black in a thermoplastic elastomer.

3. The subassembly of claim 2, in which said elastomer is a radial teleblock copolymerof styrene and butadiene.

4. An electrode subassembly, comprising a thin, flat sheet of conductive plastic, a thin, flat, dry layer of zinc particles adhesively bonded to said sheet, and a thin, flat, dry cellophane separator adhesively bonded to said anode layer.

5. The subassembly of claim 4, in which said conductive plastic comprises a dispersion of carbon black in a thermoplastic elastomer.

6. The subassembly of claim 5, in which said thermoplastic elastomer is a radial teleblock copolymer of styrene and butadiene.

7. A subassembly for use in the manufacture of laminar batteries, comprising a dry sheet of liquid permeable separator material, a dry electrode layer of active anode particles in an adhesive binder matrix adhering to one side of said sheet, and a layer of liquid impervious conductive plastic adhering to said electrode layer, in which said conductive plastic comprises a dispersion of carbon particles in a thermoplastic elastomer, and in which said adhesive binder matrix comprises the same elastomer as said elastomer in said conductive plastic.

8. The subassembly of claim 7, in which said anode particles comprise a major proportion of zinc powder and a minor proportion of carbon black, and in which said separator material comprises regenerated cellulose.

9. A laminate for use in the manufacture of laminar batteries and comprising a dry sheet of separator material, an adherent dry electrode layer of active electrode particles in a binder matrix on one side of said separator sheet, and an adherent layer of liquid impervious conductive plastic on said electrode layer, said laminate being in elongated sheet form adapted to be cut into a plurality of unitary subassemblies.

10. The laminate of claim 9, in which said separator material is regenerated cellulose, and in which said conductive plastic comprises a dispersion of carbon particles in a thermoplastic elastomer.

11. The laminate of claim 10, in which said active electrode particles comprise a major proportion of zinc particles and a minor proportion of carbon particles.

12. The laminate of claim 11, in which said binder matrix comprises an elastomer of the same composition as said elastomer in said conductive plastic.

13. The laminate of claim 12, in which said elastomer is a radial teleblock copolymer of butadiene and styrene.

14. A laminate for use in the manufacture of laminar batteries and comprising a sheet of regenerated cellulose, an adherent electrode layer of zinc particles in a binder matrix on one side of said regenerated cellulose sheet, and an adherent layer of liquid impervious conductive plastic on said electrode layer, said layers being coextensive in their major dimensions.

15. A subassembly for use in the manufacture of laminar batteries, comprising a dry sheet of liquid permeable separator material, an electrode layer of dry active anode particles in an adhesive binder matrix adhering to one side of said sheet, a layer of liquid impervious conductive plastic adhering to said electrode layer, and a frame of insulating material adhering to said conductive plastic, having border portions extending beyond the borders of said conductive plastic, and formed with a central opening within the borders of said conductive plastic.

16. A subassembly for use in the manufacture of laminar batteries, comprising a dry sheet of liquid permeable cellophane, an electrode layer of zinc particles in a dry adhesive binder matrix adhering to one side of said sheet, a layer of liquid impervious conductive plastic adhering to said electrode layer, and a frame of thermoplastic insulating material sealed to said conductive plastic and formed with a central opening.

17. A laminar electrical cell, comprising a first sheet of conductive plastic, a cathode layer adhering to a central region of said first sheet and comprising a slurry dispersion of manganese dioxide and carbon particles in an aqueous solution of electrolytes, a cellophane separator adhereing to said cathode layer, a second sheet of conductive plastic overlying said first sheet and covering said separator, and an anode layer comprising zinc particles adhered to said second sheet with an adhesive binder and in intimate contact with said cellophane separator.

18. The electrical cell of claim 17, in which said anode layer and said second sheet are coextensive with said separator.

19. A laminar electrical cell, comprising a first sheet of conductive plastic, a first electrode layer adhering to a central region of said first sheet and comprising a slurry dispersion of first electrode particles in an aqueous solution of electrolytes, a separator adhering to said first electrode layer and having borders extending beyond the boundaries of said first electrode layer, a second sheet of conductive plastic overlying said first sheet and covering said separator, and a second electrode layer comprising second electrode particles adhered to said second sheet with an adhesive binder and in contact with and coextensive with said separator.

20. A thin, flat laminar battery, comprising a stack of cells connected in series and terminated at each end by conductive plastic sheets, each of said cells comprising a cathode layer adhering to one side of one of said plastic sheets and consisting essentially of a dispersion of manganese dioxide and carbon particles in an aqueous solution of electrolytes essentially free of polymeric binders, a cellophane separator in contact with said cathode layer and having border portions extending beyond the confines of said cathode layer, and an anode layer in contact with the other side of said separator and comprising zinc particles mechanically connected to a confronting surface of another of said conductive plastic sheets with an adhesive binder, said anode layer having boundaries in registry with the boundaries of said separator and being wet by an aqueous solution of electrolytes with a viscosity of about 1 centipoise, said cells being sealed about their peripheries by insulating frames of thermoplastic material between each adjacent pair of said conductive plastic sheets and being sealed to each other and to the borders of said conductive plastic sheets.

21. A laminate for use in the manufacture of laminar batteries and comprising a dry sheet of regenerated cellulose, an adherent dry electrode layer of active electrode particles in a binder matrix adhered to a central region of one surface of said regenerated cellulose sheet, and a layer of liquid impervious conductive plastic adhering to said electrode layer and to portions of said surface of said regenerated cellulose sheet beyond said electrode layer.

22. A subassembly for use in the manufacture of laminar batteries comprising a dry sheet of regenerated cellulose, an electrode layer of zinc particles in a dry adhesive binder matrix adhering to a central region of one surface of said regenerated cellulose sheet, a liquid impervious conductive plastic layer comprising a dispersion of carbon black in a teleblock copolymer of styrene and butadiene adhering to said electrode layer and to portions of said surface of said regenerated cellulose sheet beyond said electrode layer, and a frame of thermoplastic insulating material comprising a teleblock copolymer of styrene and butadiene and from 0 to 30 parts by weight of polystyrene per 100 parts by weight of insulating material adhered to said conductive plastic layer.

23. A laminate useful in the manufacture of electrical cells and comprising a layer of powdered metal adhered to at least a portion of one surface of a smooth sheet of regenerated cellulose with a polymeric binder.

24. The laminate of claim 23, in which said powdered metal layer contains a minor proportion of carbon particles.

25. The laminate of claim 24, in which said powdered metal is zinc.

26. The laminate of claim 25, in which said polymeric binder is an elastomeric teleblock copolymer of butadiene and styrene.

27. A laminate for use in the manufacture of laminar batteries and comprising a sheet of regenerated cellulose, an adherent electrode layer of active electrode particles in a binder matric adhered to a central region of one surface of said regenerated cellulose sheet, and a layer of liquid impervious conductive plastic adhering to said electrode layer and to portions of said surface of said regenerated cellulose sheet beyond said electrode layer, said laminate being of uniform thickness and said conductive plastic layer being of varying thickness to accommodate the thickness of said electrode layer.

* * * * *